Patented Nov. 12, 1935

2,021,100

UNITED STATES PATENT OFFICE 2,021,100

PRODUCTION OF HYDROABIETYL ALCOHOLS

Clyde O. Henke, South Milwaukee, and Milton A. Prahl, Milwaukee, Wis., assignors to E. I. du Pont de Nemours & Company, Wilmington, Del., a corporation of Delaware No Drawing. Application December 21, 1932, Serial No. 648,242

12 Claims. (Cl. 260—153)

This invention relates to novel organic compounds and to a process of preparing the same. More particularly, this invention deals with the preparation of hydroabietyl alcohols of which the tetrahydro-abietyl alcohol apears to be an exceptionally valuable technical product. This product very probably corresponds to the formula $C_{19}H_{33}$—$CH_2OH$, wherein $C_{19}H_{33}$ stands for the nuclear structure of tetrahydro-abietic acid, and is a useful intermediate for the preparation of novel ethers and esters.

We have found that hydroabietyl alcohol can be readily prepared by reducing an ester of hydroabietic acid, such as the ethyl or glyceryl ester. The reduction is preferably effected in alcoholic solution by the use of a metal, such as sodium. The reaction may be illustrated by the following equation:

$C_{19}H_{33}CO$—$OC_2H_5 + 4Na + 2ROH =$
    $C_{19}H_{33}$—$CH_2ONa + NaOC_2H_5 + 2RONa$, wherein R stands for the radical of the alcohol employed as a solvent, for instance, butyl alcohol.

Either dihydro or tetrahydro-abietyl alcohol may be prepared by this method. In the case of the tetrahydro compound the product is characterized by especially high grade qualities as to purity, reactivity, etc. This product is therefore particularly valuable from the technical viewpoint.

Without limiting our invention to any particular procedure, the following examples are given for the purpose of illustrating our preferred mode of operation. Parts given are by weight.

Example 1

50 parts of metallic sodium and 200 parts of xylene are placed in a suitable vessel provided with a reflux column and heated until the sodium is melted. A solution of 80 parts of ethyl hydroabietate (prepared for instance by catalytic hydrogenation of ethyl-abietate, iodine value= 10 or 20) in 100 parts of n-butyl alcohol and 100 parts of xylene are then run in with stirring at such a rate that vigorous reaction takes place. During this procedure the mass is preferably maintained at its reflux temperature, which may vary between 120 to 135° C., depending on the rate of addition, which should preferably be as fast as possible. At the end of this step, 250 parts of additional n-butyl alcohol are stirred in while maintaining the mass at reflux temperature. After refluxing for 2 to 3 hours longer, the mass is cooled, and 750 parts of water are added. The mass is allowed to settle into layers, of which the upper layer is withdrawn and evaporated to dryness. The residue contains a mixture of hydroabietyl alcohol, and sodium hydroabietate, and may be worked up according to either of the following two methods.

Method A

The dry residue is extracted twice with a total of 800 parts of benzene at the boiling point. The combined extracts are filtered, and the filtrate is shaken once or twice with 150 to 200 parts of water, separated from the water and evaporated to dryness. The residue constitutes tetrahydro-abietyl alcohol.

Method B

The dry residue is subjected to distillation with superheated steam under a vacuum at a temperature of 180 to 225° C. The alcohol distills over with water and condenses into a pale yellow oil which rapidly becomes viscous. The oil is separated from the water layer and dried by heating in vacuo to 110° C.

Hydroabietyl alcohol as above obtained is a pale yellow, very viscous liquid. It is insoluble in water, but soluble in the usual organic solvents such as benzene, carbon tetrachloride, and alcohol. It may be vacuum distilled (high vacuum) without decomposition.

Hydroabietyl alcohol reacts readily with organic acids or anhydrides to give the corresponding esters. For instance, when heated with acetic anhydride it gives hydro-abietyl acetate. With hydroabietyl chloride it forms what appears to be hydroabietyl-hydroabietate.

In the above example, if the 80 parts of ethyl hydro-abietate are replaced by an equal weight of hydrogenated ester gum (obtained, for instance, by esterifying hydrogenated rosin with glycerine) a final product of substantially the same qualities is obtained.

Example 2

The procedure is the same as in Example 1, except that the 80 parts of ethyl hydroabietate therein used are replaced by an equal weight of the ester obtained by hydrogenating ethyl abietate to an iodine value of about 80. The product in general resembles that obtained in Example 1.

It will be understood that many variations and modifications are possible in our preferred procedure without departing from the spirit of this invention.

Thus, instead of ethyl hydroabietate in any of the above examples, the corresponding propyl, butyl, amyl, glyceryl or glycol ester may be used. Instead of butyl alcohol, ethyl, propyl, amyl, or any other convenient alcohol may be used as a solvent. Instead of xylene, benzene, toluene or other convenient hydrocarbons may be used as diluent. If desired, the diluent may be omitted altogether. Instead of sodium, any other active reducing metal may be used, for instance, potassium, lithium, or the amalgams of active metals such as aluminum amalgam and the like.

For best results, the alcohol selected as a solvent should be anhydrous, since traces of moisture under the intense reactive conditions cause part of the initial ester to saponify without undergoing reduction. The reaction, therefore, in cases like this, yields considerable quantities of sodium-hydroabietate as a by-product.

Many other variations and modifications will be readily apparent to persons skilled in the art.

We claim:

1. The process of producing a hydroabietyl alcohol which comprises reacting upon a substance containing an ester of hydroabietic acid with an active reducing metal in the presence of an alcohol.

2. The process of producing a hydroabietyl alcohol which comprises reducing the glycerine ester of hydrogenated rosin by the aid of an active metal and an alcohol.

3. The process of producing a hydroabietyl alcohol which comprises reducing ethyl hydroabietate by the aid of an active metal and an alcohol, selected from the group consisting of ethyl, propyl, butyl and amyl alcohols.

4. The process of producing a hydroabietyl alcohol which comprises reducing an ester of hydroabietic acid by the aid of sodium metal and butyl alcohol.

5. The process of producing a hydroabietyl alcohol which comprises reducing glyceryl hydroabietate by the aid of sodium metal and butyl alcohol.

6. The process of producing a hydroabietyl alcohol which comprises reducing ethyl hydroabietate by the aid of sodium metal and butyl alcohol in the presence of an aromatic hydrocarbon.

7. The process of producing tetrahydroabietyl alcohol which comprises reacting upon the glycerine ester of tetrahydro-abietic acid with metallic sodium and butyl alcohol in the presence of a hydrocarbon solvent, at the reflux temperature of the mixture.

8. The process of producing tetrahydroabietyl alcohol which comprises reacting upon ethyl tetrahydroabietate with metallic sodium and butyl alcohol in the presence of a hydrocarbon solvent, at the reflux temperature of the mixture, distilling off the solvent, and recovering tetrahydroabietyl-alcohol from the residue.

9. The process of producing tetrahydroabietyl alcohol which comprises reacting upon an ester of tetrahydro-abietic acid with metallic sodium and butyl alcohol in the presence of a hydrocarbon solvent, at the reflux temperature of the mixture, distilling off the solvent, and extracting tetrahydro-abietyl alcohol from the residue by the aid of a hydrocarbon solvent.

10. The process of producing tetrahydroabietyl alcohol which comprises reacting upon an ester of tetrahydro-abietic acid with metallic sodium and butyl alcohol in the presence of a hydrocarbon solvent, at the reflux temperature of the mixture, distilling off the solvent, and steam distilling the residue under a vacuum to recover therefrom tetrahydroabietyl alcohol.

11. The compound tetrahydroabietyl alcohol.

12. In the process of producing hydroabietyl alcohol, the step which comprises reacting with metallic sodium upon a substance containing an ester of hydroabietic acid in the presence of a lower aliphatic alcohol.

CLYDE O. HENKE.
MILTON A. PRAHL.

DISCLAIMER 2,021,100.—*Clyde O. Henke*, South Milwaukee, and *Milton A. Prahl*, Milwaukee, Wis. PRODUCTION OF HYDROABIETYL ALCOHOLS. Patent dated November 12, 1935. Disclaimer filed September 28, 1936, by the assignee, *E. I. du Pont de Nemours and Company*.

Hereby enters this disclaimer as to claim 11 of said patent.

[*Official Gazette October 20, 1936.*]